United States Patent
Li et al.

(10) Patent No.: US 11,306,795 B1
(45) Date of Patent: Apr. 19, 2022

(54) MAGNETIC FLUID DAMPER

(71) Applicant: Tsinghua University, Beijing (CN)

(72) Inventors: Decai Li, Beijing (CN); Qian Li, Beijing (CN); Pengdong Han, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/378,149

(22) Filed: Jul. 16, 2021

(30) Foreign Application Priority Data

Nov. 11, 2020 (CN) .......................... 202011256854.8
Nov. 11, 2020 (CN) .......................... 202022601593.0

(51) Int. Cl.
F16F 7/104 (2006.01)
F16F 6/00 (2006.01)
F16F 7/08 (2006.01)

(52) U.S. Cl.
CPC ............... *F16F 7/104* (2013.01); *F16F 6/00* (2013.01); *F16F 7/08* (2013.01); *F16F 2222/04* (2013.01); *F16F 2222/06* (2013.01); *F16F 2222/08* (2013.01); *F16F 2224/0225* (2013.01); *F16F 2224/04* (2013.01)

(58) Field of Classification Search
CPC ... F16F 6/00; F16F 2224/0225; F16F 2224/04
See application file for complete search history.

(56) References Cited

U.S. PATENT DOCUMENTS

2012/0168271 A1 * 7/2012 Ryaboy ............... G01M 5/0066
188/379

FOREIGN PATENT DOCUMENTS

| CN | 102032304 | | 4/2011 | |
|----|-----------|---|--------|---|
| CN | 103122960 | | 5/2013 | |
| CN | 103939618 | A * | 7/2014 | |
| CN | 104074903 | A * | 10/2014 | |
| CN | 108061126 | A * | 5/2018 | |
| SU | 1762035 | A1 * | 9/1992 | ............... F16F 6/00 |

* cited by examiner

*Primary Examiner* — Melody M Burch
(74) *Attorney, Agent, or Firm* — Hodgson Russ LLP

(57) ABSTRACT

A magnetic fluid damper includes a housing defining a cavity; a plurality of mass blocks located in the cavity and spaced from each other in a first direction; at least one energy dissipating assembly, in which the plurality of mass blocks and the at least one energy dissipating assembly are arranged alternately along the first direction in the cavity, in which each energy dissipating assembly includes a first permanent magnet and a first porous medium member, pores of each first porous medium member being filled with first magnetic fluid; and a plurality of reset parts cooperating with the plurality of mass blocks in one-to-one correspondence to apply restoring forces in a second direction to the mass blocks, in which restoring forces received by two mass blocks adjacent in the first direction are not equal.

5 Claims, 1 Drawing Sheet

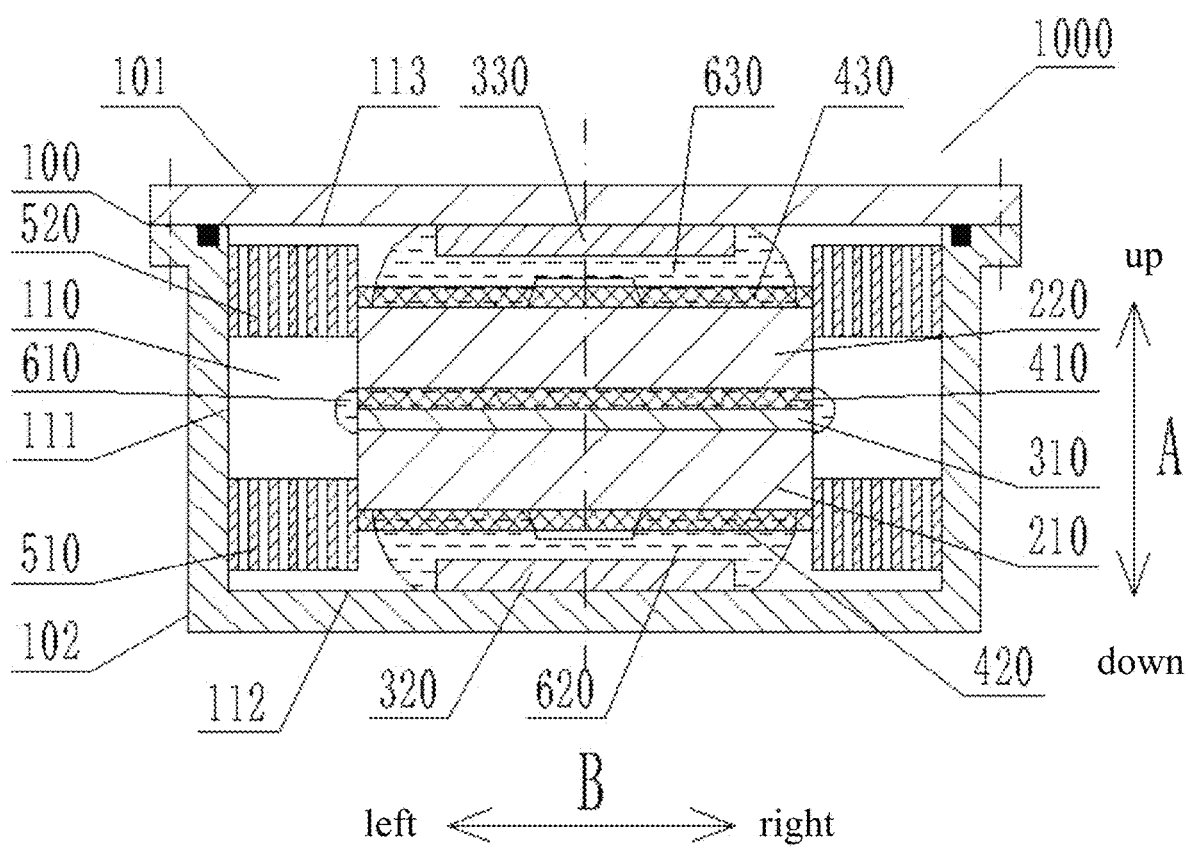

MAGNETIC FLUID DAMPER

CROSS REFERENCE TO RELATED APPLICATION

This application claims the benefit of and priority to Chinese Application No. 202011256854.8 and Chinese Application No. 202022601593.0, both filed on Nov. 11, 2020, the entire contents of which are incorporated herein by reference.

FIELD

This application relates to the field of mechanical engineering vibration control, and more particularly, to a magnetic fluid damper.

BACKGROUND

In the field of spaceflight, passive dampers are well suited for spacecraft due to energy limitations, especially for low-frequency and small-amplitude vibrations generated by long and straight objects in the spacecraft, such as vibrations of antennas and solar panels, which are difficult in the field of vibration control. A magnetic fluid damper is a passive damper which is suitable for low-frequency and small-amplitude vibrations, and is characterized by zero energy consumption, sensitivity to inertia force, a simple structure, fast damping speed and a long life. Thus, the magnetic fluid damper is especially suitable for low-frequency and small-amplitude vibrations of long straight objects in the field of spaceflight. In addition, the magnetic fluid damper also has a great application prospect in ground systems, such as vibration isolation platforms, high-power antenna damping and so on.

In the related art, a damping mass block is mainly a permanent magnet, and shearing effects are generated due to relative motion between the permanent magnet and magnetic fluid, leading to energy dissipation, as mentioned in document 1 (a patent application published as CN104074903A), document 2 (a patent application published as CN102032304A), and document 3 (published as CN103122960A). The existing magnetic fluid dampers are mainly based on the second-order buoyancy principle and have following disadvantages. First, the spacecraft will experience great acceleration during a launch process, which may cause collisions, thus leading to breakage of the permanent magnet due to its brittle material; second, the improvement of damping effects is usually based on changes in the shape of the permanent magnet, but the permanent magnet is hard to process, especially for complex patterns; third, there is a small friction surface that can exert a damping effect, and the damping effect is poor. Therefore, it is urgent to redesign the magnetic fluid damper to solve the above problems and make it more practical in the engineering.

SUMMARY

A magnetic fluid damper according to embodiments of the present disclosure includes: a housing defining a cavity, and having a first wall surface and a second wall surface opposite to each other in a first direction; a plurality of mass blocks located in the cavity and spaced from each other in the first direction; at least one energy dissipation assembly, in which the plurality of mass blocks and the at least one energy dissipation assembly are arranged alternately along the first direction in the cavity, and each of the at least one energy dissipation assembly is located between two adjacent mass blocks in the first direction, in which each of the at least one energy dissipation assembly includes a first permanent magnet and a first porous medium member, the first permanent magnet of each of the at least one energy dissipation assembly being arranged on one of corresponding two adjacent mass blocks, and the first porous medium member of each of the at least one energy dissipation assembly being arranged on the other of the corresponding two adjacent mass blocks, and in which pores of the first porous medium member of each of the at least one energy dissipation assembly are filled with first magnetic fluid, and a plurality of reset parts cooperating with the plurality of mass blocks in one-to-one correspondence to apply restoring forces to the plurality of mass blocks in a second direction, in which the restoring forces received by two mass blocks adjacent in the first direction are not equal.

BRIEF DESCRIPTION OF THE DRAWINGS

FIG. 1 is a structural diagram of a magnetic fluid damper according to embodiments of the present disclosure.

DETAILED DESCRIPTION

Embodiments of the present disclosure are described in detail below, and examples of the described embodiments are shown in accompanying drawings. The following embodiments described with reference to the accompanying drawings are exemplary and are intended to explain the present disclosure rather than limit the present disclosure.

A magnetic fluid damper 1000 according to embodiments of the present disclosure will be described below with reference to the accompanying drawings. As shown in FIG. 1, the magnetic fluid damper 1000 according to the embodiments of the present disclosure includes a housing 100, a plurality of mass blocks, at least one energy dissipation assembly, and a plurality of reset parts.

The housing 100 defines a cavity 110, and the housing 100 includes a cover body 101 and a housing body 102. The housing 100 has a peripheral wall surface 111, and has a first wall surface 112 and a second wall surface 113 opposite to each other in a first direction. The peripheral wall surface 111 is located between the first wall surface 112 and the second wall surface 113.

The plurality of mass blocks are located in the cavity 110, and the plurality of mass blocks are spaced from each other in the first direction. The plurality of mass blocks and at least one energy dissipation assembly are arranged alternately along the first direction in the cavity, and each of the at least one energy dissipation assembly is located between two adjacent mass blocks in the first direction. Each of the at least one energy dissipation assembly includes a first permanent magnet 310 and a first porous medium member 410, in which the first permanent magnet 310 of each energy dissipation assembly is arranged on one of corresponding two adjacent mass blocks, and the first porous medium member 410 of each energy dissipation assembly is arranged on the other of the corresponding two adjacent mass blocks. Pores of each first porous medium member 410 are filled with first magnetic fluid 610.

The plurality of reset parts cooperate with the plurality of mass blocks in one-to-one correspondence to apply restoring forces to the mass blocks in a second direction, in which restoring forces received by two mass blocks adjacent in the first direction are not equal.

The magnetic fluid damper 1000 according to the embodiments of the present disclosure is provided with the plurality of reset parts, and two adjacent mass blocks in the first direction are not subject to equal restoring forces in the second direction. When the plurality of mass blocks move under the influence of vibrational mechanical energy, due to the cooperation of the plurality of reset parts and the plurality of mass blocks in one-to-one correspondence, each reset part can apply the restoring force in the second direction to the corresponding mass block, when each mass block gets in contact with the reset part cooperating with it. Since restoring forces on two mass blocks adjacent in the first direction are not equal, the two mass blocks adjacent in the first direction can move relative to each other.

The plurality of mass blocks and at least one energy dissipation assembly are arranged alternately along the first direction in the cavity, and each of the at least one energy dissipation assembly is located between two adjacent mass blocks in the first direction. Each energy dissipation assembly includes the first permanent magnet 310 and the first porous medium member 410, the first permanent magnet 310 of each energy dissipation assembly is arranged on one of corresponding two adjacent mass blocks, and the first porous medium member 410 of each energy dissipation assembly is arranged on the other of the corresponding two adjacent mass blocks. Since the two mass blocks adjacent in the first direction can move relative to each other, the first permanent magnet 310 and the first porous medium member 410 cooperating with the first permanent magnet in each energy dissipation assembly can move relative to each other.

The pores of each first porous medium member 410 is filled with the first magnetic fluid 610. Therefore, part of the first magnetic fluid 610 is attracted by a corresponding first permanent magnet 310 and moves relative to a corresponding first porous medium member 410.

For example, when the first permanent magnet 310 moves relative to the first porous medium member 410 and meanwhile makes part of the first magnetic fluid 610 move rapidly with the first permanent magnet 310, another part of the first magnetic fluid 610 which is in contact with the adjacent mass block keeps relatively static to the first permanent magnet 310. Therefore, the first magnetic fluid 610 has a magnetic fluid layer with a velocity gradient. The first magnetic fluid 610 with different moving velocities shears and rubs against each other, which converts mechanical energy into thermal energy. Thus, the first magnetic fluid 610 realizes viscous dissipation of energy, enhancing the damping effect.

Due to the pores of the first porous medium member 410, a solid-liquid contact area is enlarged and the velocity gradient in the first magnetic fluid 610 is also increased, thereby improving friction energy dissipation and viscous energy dissipation, and further enhancing the damping effect.

At the same time, the first magnetic fluid 610 passes through different pores of the first porous medium member 410 in different velocities. When the first magnetic fluid 610 with different velocities meets, the first magnetic fluid with different velocities may shear and rub against each other, thus converting mechanical energy into thermal energy, and the first magnetic fluid 610 can realize viscous dissipation of energy, further enhancing the damping effect.

By placing the first magnetic fluid 610 in the pores of the first porous medium 410, the volatilization of the first magnetic fluid 610 can be reduced and the damping effect of the magnetic fluid damper is more stable.

Therefore, the magnetic fluid damper 1000 according to the embodiments of the present disclosure has a good and stable damping effect.

The magnetic fluid damper 1000 according to embodiments of the present disclosure includes a housing 100, a plurality of mass blocks, at least one energy dissipation assembly, and a plurality of reset parts.

The housing 100 defines a cavity 110, and the housing 100 includes a cover body 101 and a housing body 102. The housing 100 has a peripheral wall surface 111, and has a first wall surface 112 and a second wall surface 113 opposite to each other in a first direction. The peripheral wall surface 111 is located between the first wall surface 112 and the second wall surface 113.

The plurality of mass blocks are located in the cavity 110, and the plurality of mass blocks are spaced from each other in the first direction. The plurality of mass blocks and the at least one energy dissipation assembly are arranged alternately along the first direction in the cavity, and each of the at least one energy dissipation assembly is located between two adjacent mass blocks in the first direction. Each of the at least one energy dissipation assembly includes a first permanent magnet 310 and a first porous medium member 410, in which the first permanent magnet 310 of each energy dissipation assembly is arranged on one of corresponding two adjacent mass blocks, and the first porous medium member 410 of each energy dissipation assembly is arranged on the other of the corresponding two adjacent mass blocks. Pores of each first porous medium member 410 are filled with first magnetic fluid 610.

The plurality of reset parts cooperate with the plurality of mass blocks in one-to-one correspondence to apply restoring forces to the mass blocks in a second direction, in which restoring forces received by two mass blocks adjacent in the first direction are not equal.

For example, the first direction may be an up-down direction, and the second direction may be a left-right direction. The up-down direction is shown as arrow A in FIG. 1, and the left-right direction is shown as arrow B in FIG. 1.

In some embodiments, the plurality of mass blocks include a first mass block 210 and a second mass block 220, and the plurality of reset parts include a first reset part and a second reset part. That is, the number of mass blocks is two, so there is one energy dissipation assembly and two reset parts. The first reset part cooperates with the first mass block 210, that is, the first reset part applies a first restoring force in the second direction to the first mass block 210. The second reset part cooperates with the second mass block 220, that is, the second reset part applies a second restoring force in the second direction to the second mass block 220.

In some embodiments, the first reset part is a first elastic member, the second reset part is a second elastic member, and the first elastic member and the second elastic member are both located in the cavity 110. Specifically, the first elastic member is a first scroll spring 510 fitted over at least a part of the first mass block 210; and the second elastic member is a second scroll spring 520 fitted over at least a part of the second mass block 220.

As shown in FIG. 1, in some embodiments, the first elastic member is adjacent to the second elastic member, and the stiffness of the first elastic member is not equal to the stiffness of the second elastic member. For example, the stiffness of the first scroll spring 510 is not equal to the stiffness of the second scroll spring 520. Therefore, the first restoring force applied in the second direction by the first elastic member to the first mass block 210 is different from the second restoring force applied by the second elastic member to the second mass block 220. Thus, the first mass block 210 and the second mass block 220 can move relative to each other, and the first permanent magnet 310 moves relative to the first porous medium member 410.

For example, when the first permanent magnet 310 moves relative to the first porous medium member 410 and meanwhile makes part of the first magnetic fluid 610 move rapidly with the first permanent magnet 310, another part of the first magnetic fluid 610 which is in contact with the adjacent mass block keeps relatively static to the first permanent magnet 310. Therefore, the first magnetic fluid 610 has a magnetic fluid layer with a velocity gradient. The first magnetic fluid 610 with different moving velocities shears and rubs against each other, which converts mechanical energy into thermal energy. Thus, the first magnetic fluid 610 realizes viscous dissipation of energy, enhancing the damping effect.

Due to the pores of the first porous medium member 410, a solid-liquid contact area is enlarged and the velocity gradient in the first magnetic fluid 610 is also increased, thereby augmenting friction energy dissipation and viscous energy dissipation, and further enhancing the damping effect.

At the same time, the first magnetic fluid 610 passes through different pores of the first porous medium member 410 in different velocities. When the first magnetic fluid 610 with different velocities meets, the first magnetic fluid with different velocities may shear and rub against each other, thus converting mechanical energy into thermal energy, and the first magnetic fluid 610 can realize viscous dissipation of energy, further enhancing the damping effect.

In some embodiments, the plurality of mass blocks further include at least one third mass block, and the at least one third mass block is located between the first mass block 210 and the second mass block 220 in the first direction. The plurality of reset parts further include at least one third reset part, and the at least one third reset part cooperates with the at least one third mass block in one-to-one correspondence, that is, the third reset part applies a third restoring force to the third mass block corresponding to the third reset part.

Each of the at least one third reset part is a third elastic member, and each of the at least one third reset part is located in the cavity 110. The third elastic member is a third scroll spring fitted over at least a part of the corresponding third mass block. The third scroll spring applies the third restoring force to the third mass block corresponding to the third scroll spring.

When there is one third mass block, the number of the energy dissipation assemblies is two, and the third restoring force is not equal to the first restoring force and the second restoring force.

When there are a plurality of third mass blocks, the stiffness of a third elastic member adjacent to the first elastic member in the first direction is not equal to the stiffness of the first elastic member. For example, the stiffness of the first scroll spring 510 is not equal to the stiffness of the third scroll spring. Therefore, the first restoring force applied by the first elastic member to the first mass block 210 is different from the third restoring force applied by the third elastic member to the third mass block. Thus, the first mass block 210 and the third mass block can move relative to each other.

The stiffness of a third elastic member adjacent to the second elastic member in the first direction is not equal to the stiffness of the second elastic member. For example, the stiffness of the second scroll spring 520 is not equal to the stiffness of the third scroll spring. Thus, the second restoring force applied by the second elastic member to the second mass block 220 is different from the third restoring force applied by the third elastic member to the third mass block. Thus, the second mass block 220 and the third mass block can move relative to each other.

The stiffness of two adjacent third elastic members in the first direction is not equal. For example, the stiffness of two adjacent third springs in the first direction is not equal, so that third restoring forces applied by two adjacent third elastic members to corresponding third mass blocks are not equal. Thus, two adjacent third mass blocks can move relative to each other.

The relative movement of the two adjacent mass blocks allows that part of the first magnetic fluid 610 between the two adjacent mass blocks moves relative to the corresponding first porous medium member 410, improving the damping effect.

The magnetic fluid damper 1000 according to the embodiments of the present disclosure also includes: a second permanent magnet 320, a third permanent magnet 330, a second porous medium member 420, and a third porous medium member 430.

The second permanent magnet 320 is arranged on the first wall surface 112 of the housing 100, the third permanent magnet 330 is arranged on the second wall surface 113 of the housing 100, and the second permanent magnet 320 and the third permanent magnet 330 are opposite in the first direction.

The second porous medium member 420 is located between the first mass block 210 and the second permanent magnet 320 in the first direction, and the second porous medium member 420 is arranged on the first mass block 210, in which pores of the second porous medium member 420 are filled with second magnetic fluid 620. The second magnetic fluid 620 is filled between the second porous medium member 420 and the second permanent magnet 320 to facilitate the contact between the second magnetic fluid 620 and the second permanent magnet 320, so that the second permanent magnet 320 can absorb the second magnetic fluid 620. When the first mass block 210 moves, the second porous medium member 420 is driven to move, and part of the second magnetic fluid 620 is driven to move rapidly along with the first mass block 210 and the second porous medium member 420; another part of the second magnetic fluid 620 which is in contact with the second permanent magnet 320 keeps static. Therefore, the second magnetic fluid 620 has a magnetic fluid layer with a velocity gradient. The second magnetic fluid 620 with different moving velocities shears and rubs against each other, which converts mechanical energy into thermal energy, thereby causing viscous energy dissipation of the second magnetic fluid 620 and enhancing the damping effect. Due to the pores of the second porous medium member 420, a solid-liquid contact area is enlarged and the velocity gradient in the second magnetic fluid 620 is also increased, thereby augmenting friction energy dissipation and viscous energy dissipation, and further enhancing the damping effect.

The third porous medium member 430 is located between the second mass block 220 and the third permanent magnet 330 in the first direction, and the third porous medium member 430 is arranged on the second mass block 220, in which pores of the third porous medium member 430 is filled with third magnetic fluid 630. The third magnetic fluid 630 is filled between the third porous medium member 430 and the third permanent magnet 330 to facilitate contact between the third permanent magnet 330 and the third magnetic fluid 630, so that the third permanent magnet 330 can absorb the third magnetic fluid 630. When the second mass block 220 moves, the third porous medium member 430 is driven to move, and part of the third magnetic fluid 630 is driven to move rapidly along with the second mass block 220 and the third porous medium member 430; another part of the third magnetic fluid 630 which is in contact with the third permanent magnet 330 keeps static. Therefore, the third magnetic fluid 630 has a magnetic fluid layer with a velocity gradient. The third magnetic fluid 630 with different moving velocities shears and rubs against each other, which converts mechanical energy into thermal energy, thereby causing viscous energy dissipation of the third magnetic fluid 630 and enhancing the damping effect. Due to the pores of the third porous medium member 430, a solid-liquid contact area is enlarged and the velocity gradient in the third magnetic fluid 630 is also increased, thereby augmenting friction energy dissipation and viscous energy dissipation, and further enhancing the damping effect.

By placing the second magnetic fluid 620 in the pores of the second porous medium 420, the volatilization of the second magnetic fluid 620 can be reduced; and by placing the third magnetic fluid 630 in the pores of the third porous medium member 430, the volatilization of the third magnetic fluid 630 can be reduced. Thus, the damping effect of the magnetic fluid damper is more stable.

In some embodiments, the first porous medium member 410, the second porous medium member 420, and the third porous medium member 430 are resilient and contain a plurality of micron or nanoscale pores. The first porous medium member 410, the second porous medium member 420, and the third porous medium member 430 are made of at least one of sponge, foam carbon and foam copper. The first porous medium member 410, the second porous medium member 420, and the third porous medium member 430 are resilient to prevent the mass blocks and the permanent magnets from colliding with each other and being damaged.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features defined with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation on the present disclosure, and changes, modifications, alternatives and variations can be made in the above embodiments within the scope of the present disclosure.

What is claimed is:

1. A magnetic fluid damper, comprising:
a housing defining a cavity, and having a first wall surface and a second wall surface opposite to each other in a first direction;
a plurality of mass blocks located in the cavity and spaced from each other in the first direction;
at least one energy dissipation assembly, wherein the plurality of mass blocks and the at least one energy dissipation assembly are arranged alternately along the first direction in the cavity, and each of the at least one energy dissipation assembly is located between two adjacent mass blocks in the first direction, wherein each of the at least one energy dissipation assembly comprises a first permanent magnet and a first porous medium member, the first permanent magnet of each of the at least one energy dissipation assembly being arranged on one of corresponding two adjacent mass blocks, and the first porous medium member of each of the at least one energy dissipation assembly being arranged on the other of the corresponding two adjacent mass blocks, and wherein pores of the first porous medium member of each of the at least one energy dissipation assembly are filled with first magnetic fluid, and a plurality of reset parts cooperating with the plurality of mass blocks in one-to-one correspondence to apply restoring forces in a second direction to the plurality of mass blocks, wherein the restoring forces received by two mass blocks adjacent in the first direction are not equal;

wherein the plurality of mass blocks comprise a first mass block and a second mass block, and the plurality of reset parts comprise a first reset part and a second reset part, the first reset part cooperating with the first mass block, and the second reset part cooperating with the second mass block;

wherein the first reset part is a first elastic member, the second reset part is a second elastic member, and the first elastic member and the second elastic member are both located in the cavity.

2. The magnetic fluid damper according to claim 1, wherein the first elastic member is a first scroll spring fitted over at least a part of the first mass block, and the second elastic member is a second scroll spring fitted over at least a part of the second mass block.

3. A magnetic fluid damper, comprising:

a housing defining a cavity, and having a first wall surface and a second wall surface opposite to each other in a first direction;

a plurality of mass blocks located in the cavity and spaced from each other in the first direction, the plurality of mass blocks comprising a first mass block and a second mass block;

at least one energy dissipation assembly, wherein the plurality of mass blocks and the at least one energy dissipation assembly are arranged alternately along the first direction in the cavity, and each of the at least one energy dissipation assembly is located between two adjacent mass blocks in the first direction, wherein each of the at least one energy dissipation assembly comprises a first permanent magnet and a first porous medium member, the first permanent magnet of each of the at least one energy dissipation assembly being arranged on one of corresponding two adjacent mass blocks, and the first porous medium member of each of the at least one energy dissipation assembly being arranged on the other of the corresponding two adjacent mass blocks, and wherein pores of the first porous medium member of each of the at least one energy dissipation assembly are filled with first magnetic fluid;

a plurality of reset parts cooperating with the plurality of mass blocks in one-to-one correspondence to apply restoring forces in a second direction to the plurality of mass blocks, wherein the restoring forces received by two mass blocks adjacent in the first direction are not equal, and wherein the plurality of reset parts comprise a first reset part cooperating with the first mass block and a second reset part cooperating with the second mass block;

a second permanent magnet and a third permanent magnet, wherein the second permanent magnet is arranged on the first wall surface of the housing, the third permanent magnet is arranged on the second wall surface of the housing, and the second permanent magnet and the third permanent magnet are opposite in the first direction;

a second porous medium member located between the first mass block and the second permanent magnet in the first direction and arranged on the first mass block, wherein pores of the second porous medium member are filled with second magnetic fluid; and a third porous medium member located between the second mass block and the third permanent magnet in the first direction and arranged on the second mass block, wherein pores of the third porous medium member are filled with third magnetic fluid.

4. The magnetic fluid damper according to claim 3, wherein the second magnetic fluid is filled between the second porous medium member and the second permanent magnet and contacts the second permanent magnet, and wherein the third magnetic fluid is filled between the third porous medium member and the third permanent magnet and contacts the third permanent magnet.

5. The magnetic fluid damper according to claim 3, wherein the first porous medium member, the second porous medium member, and the third porous medium member are made of at least one of sponge, foam carbon and foam copper.

* * * * *